Dec. 15, 1970 B. J. WARMAN ET AL 3,548,406

DIGITAL TRANSLATOR

Filed Jan. 20, 1967 3 Sheets-Sheet 1

Dec. 15, 1970 B. J. WARMAN ET AL 3,548,406

DIGITAL TRANSLATOR

Filed Jan. 20, 1967 3 Sheets-Sheet 3

3,548,406

DIGITAL TRANSLATORS

Bloomfield James Warman, London, James George Taylor, Hassocks, and Keith Richardson, London, England, assignors to Associated Electrical Industries Limited, London, England, a British company Filed Jan. 20, 1967, Ser. No. 610,599
Claims priority, application Great Britain, Feb. 3, 1966, 4,841/66
Int. Cl. H03k 13/247
U.S. Cl. 340—347 3 Claims

ABSTRACT OF THE DISCLOSURE

A ring core telephone translator in which the code wires are individually selectable by gating circuits at each end of the wires. Each code wire is connected in series with a rectifier individual to it and normally reverse biased, and a code wire is selected by three gating circuits, two at one end and one at the other end, which in combination are effective to overcome the reverse bias and provide a current pulse in the selected code wire.

BACKGROUND OF THE INVENTION

The present invention relates to data translators for translating an electrically represented set of digits into another such set of digits, and is especially applicable to telephone code translators for translating subscriber dialling codes into equipment codes.

A data translator such as that described in our copending application No. 579,862, and now abandoned, could be arranged to embody the present invention. Such a translator comprises a translation field in which translation wires respectively corresponding to different three-digit combinations or codes, to be translated are threaded through different combinations of wound ring cores according to the translations required. Three digits of a combination to be translated, e.g. the hundreds, tens, and units digits of a dialed code, are separately represented in binary code and applied to respective "ordinates" of a three-dimensional matrix system to identify and selectively mark the corresponding translation wire. For this purpose two ordinates of the matrix, i.e. those represented by two digits, are combined at one end of the translation wires with the remaining ordinate at the other end of the wires.

By analogy with so called code-point translators, selectively marked translation wires as exemplified by those in the above form of translator will be termed code wires.

SUMMARY OF THE INVENTION

According to the present invention a data translator includes a plurality of code wires extending in series with individual unidirectionally conductive devices between a first position at which each such code wire is connected to a common connection for a sub-group of the code wires and to the junction between a resistor and a capacitor for the sub-group and a second position at which the code wires are commoned together in sets in such a way that each set includes one and only one code wire of each sub-group, together with marking circuit means comprising bias marking circuit means each serving a group of sub-groups through corresponding resistors associated with these sub-groups, first pulse marking circuit means each serving, through the corresponding capacitors, a plurality of sub-groups one from each group, and second pulse marking circuit means each serving at said second position a set of the code wires, each bias marking and first pulse marking circuit means being responsive dependent on receipt of respective signals representative respectively of the group and the sub-group in that group to which they pertain to mark this sub-group, and each second pulse marking means being responsive dependent on receipt of a signal representative of its respective set to mark the code wires of that set whereby a single code wire only will be marked on response of any particular combination of a bias marking and a first and a second pulse marking circuit means.

In the telephone translator according to the above-mentioned application the code wire (translation wire) marking will be in the form of a current pulse to provide output signals from those wound cores associated with the particular translation wire in the translation field. In order to provide such a pulse it is proposed that each code wire and its associated unidirectionally conductive device shall when quiescent be subjected to a potential difference such as to reverse bias the unidirectionally conductive device, and that the first and second pulse marking circuit means shall be effective on receipt of their respective signals to apply to the wire at opposite ends thereof a voltage pulse tending to forward bias the said device end of sufficient magnitude in combination with simultaneous bias marking applied via the resistor by the bias marking circuit means to overcome the reverse bias voltage and produce a current pulse through the code wire and the unidirectionally conductive device.

DESCRIPTION OF THE PREFERRED EMBODIMENT

Figure 1:
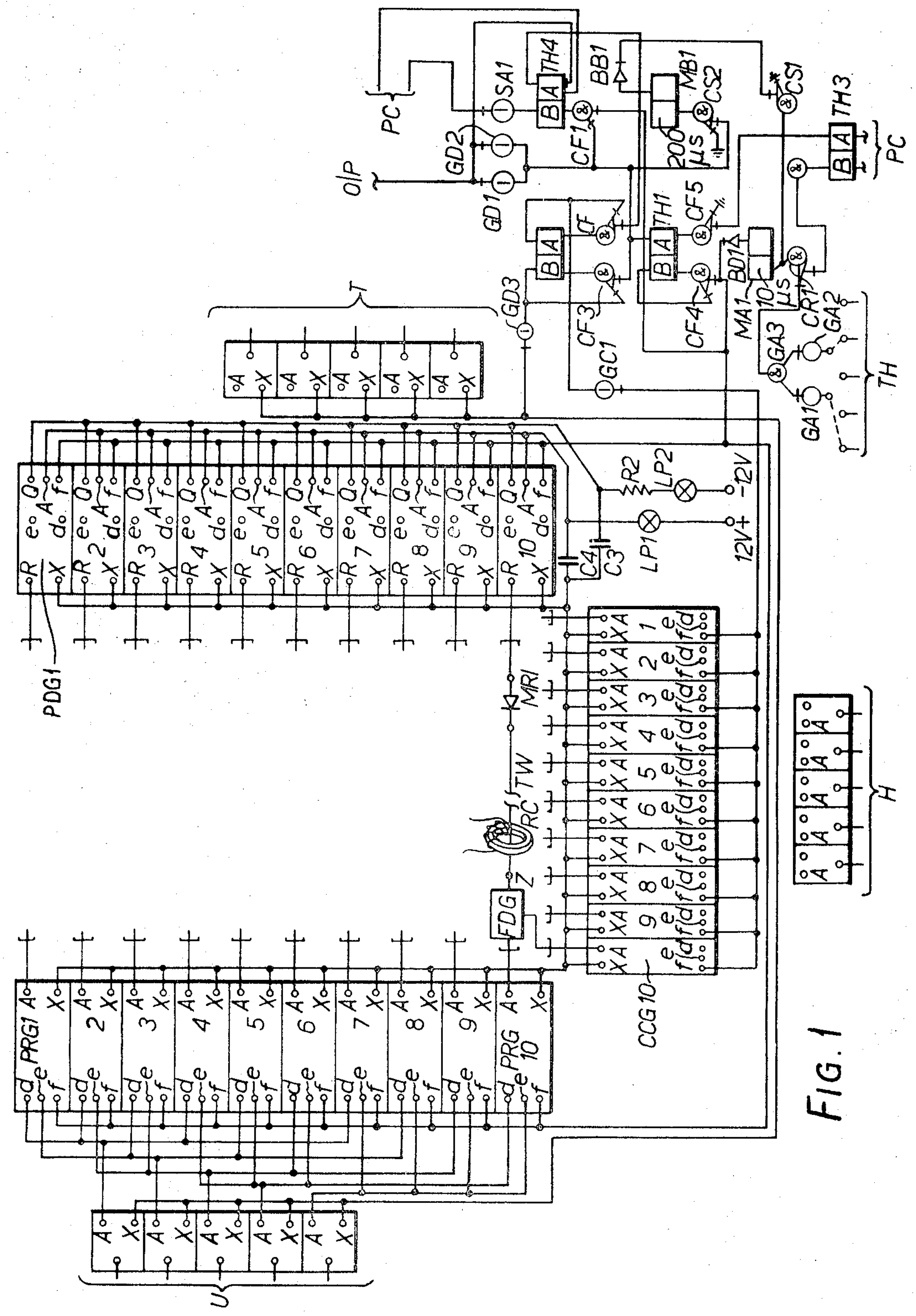
FIG. 1 shows somewhat schematically the general arrangement of a translator according to the invention.

Referring to FIG. 1 a code wire such as TW is connected at one end in series with a diode MR1 and at the other end to a field drive gate FDG. In this particular example the translator is arranged for up to 1000 translations, requiring 1000 such code wires; the units, tens, and hundreds input equipments are represented respectively by U, T and H. In order to select a particular translator, for example one of five serving 5000 subscribers, a selection arrangement responsive to a thousands digit is included as shown at TH.

As shown, the units input equipment U for receiving the units input digit in 2/5 code is connected with pulse marking gates or pulse receive gates PRG1–10. The tens and hundreds input equipments for receiving the tens and hundreds input digits in 2/5 code are correspondingly connected with the pulse marking gates or pulse drive gates PDG1–10 and has marking gates or bias gates CCG1–10 respectively, although for clarity the connections between the corresponding terminals are not shown. The pulse marking gates are so named because such gates apply a relatively short (pulse) marking signal whereas, similarly, the bias marking gates apply a relatively long marking signal.

Figure 2:
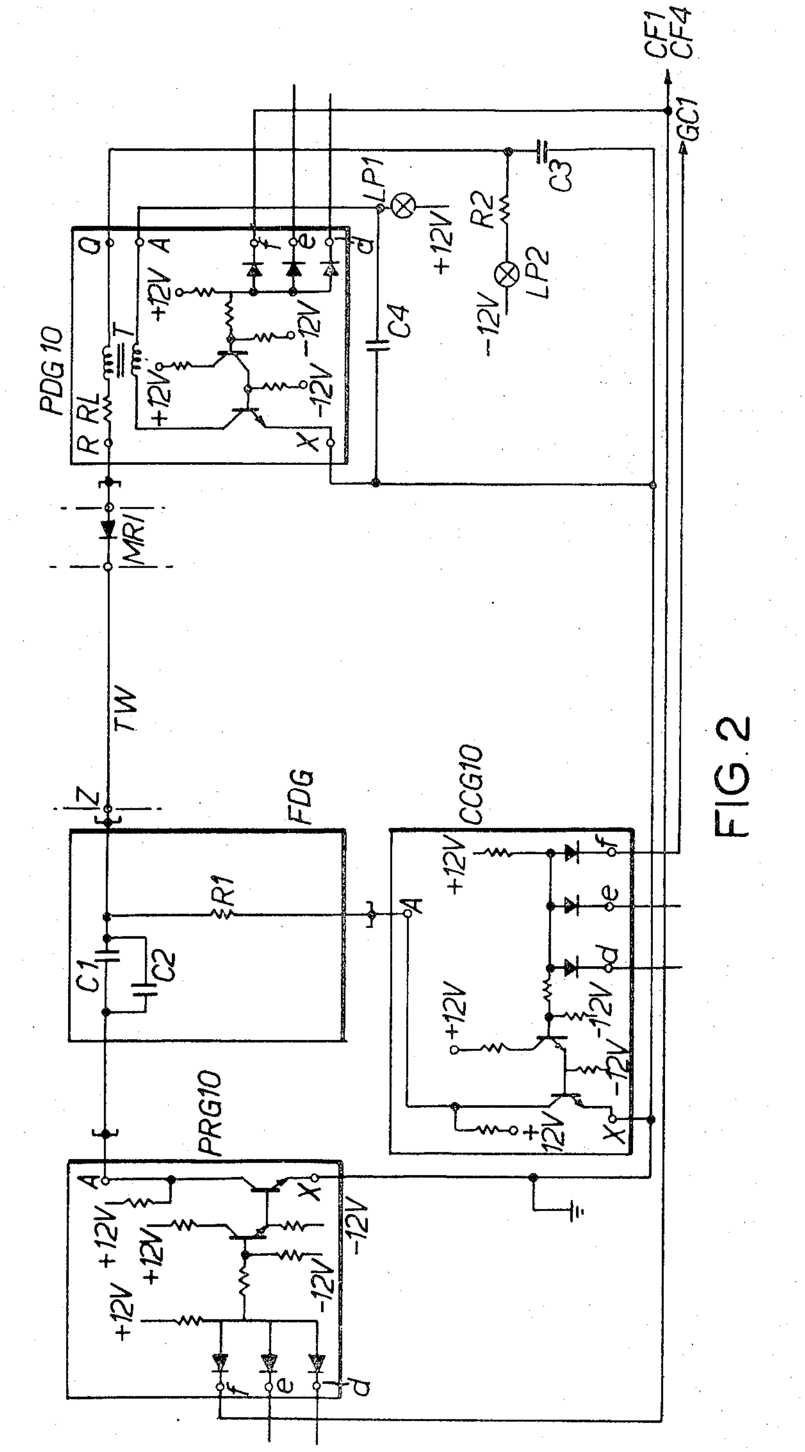
FIG. 2 shows an arrangement of pulse and bias gates for driving the field gates.

Referring to FIG. 2, three similar gating circuits are shown constituting the pulse receive gate PRG10, the pulse drive gate PDG10 and the bias gate CCG10. Corresponding lettering is used throughout the figures to denote the terminal connections such as *f*, *e*, *d*, A etc. The diode MR1 forms part of the field drive gate FDG but is connected at the other end of the code wire TW.

The pulse drive gate PDG10 comprises inter alia an easily saturable output transformer T coupling the gating circuit with the code wire TW. A current limiting resistor RL is connected in series with wire between terminal R and the secondary of the transformer T. The other side of the secondary is connected via a terminal Q of the pulse drive gate to a $-Ve$ source ($-12$ v.) over a resistor R and a lamp LP2, and, via a capacitor $C_3$, to ground and to terminals X of the pulse receive gates and bias gates. The field drive gate FDG comprises bias input resistor $R_1$ and pulse input parallel capacitors $C_1$ and $C_2$.

Figure 3:
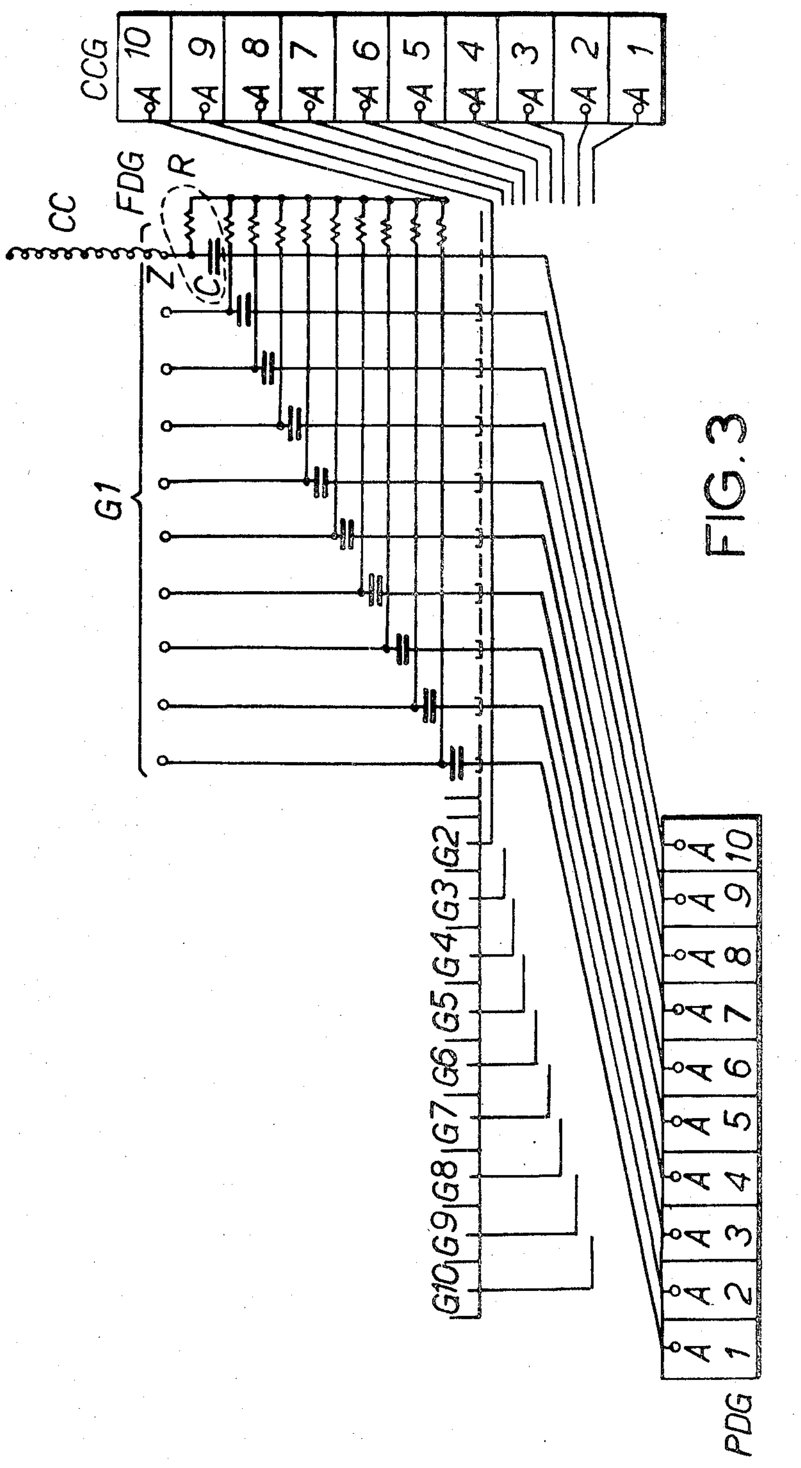
FIG. 3 shows the commoning arrangement whereby the circuits of FIG. 2 are incorporated into the general arrangement of FIG. 1.

FIG. 3 shows the commoning arrangement for the field drive gates and the terminals of the code wires such as terminal Z. Each bias gate such as CCG10 serves ten field drive gates FDG via resistors such as $R_1$, and each field drive gate serves ten code wires via terminal Z by virtue of commoning connections CC. Each field drive gate is served by a pulse receive gate PRG. Thus a group G1 of 100 code wires is served by bias gate CCG10 and ten pulse receive gates PRG1–10 via ten field drive gates FDG.

Each of nine other groups G2–G10 has a similar arrangement of ten field drive gates served in common by a bias gate CCG and respectively by the same ten pulse receive gates PRG1–10.

Considering the operation of the circuit the pulse gates PDG and PRG and the bias gates CCG are normally held closed or "off" in the quiescent condition by ground potentials on their inputs $f$, causing the output transistors of the gates to be off. The units tens and hundreds highways normally carry a $+12$ v. potential and on receipt of digit inputs in the form of ground marking conditions in two-out-of-five code, the input equipments are effective to apply $+12$ v. potential to both the $d$ and $e$ inputs of only one selected pulse or bias gate (as the case may be). Thence by then pulsing the $f$ inputs with a $+12$ v. pulse only the selected gate will have all three inputs $d$, $e$ and $f$ marked with $+12$ v., thus turning on the gate output transistors.

Each decimal digit of a code to be translated is applied in a 2/5 code to its respective input equipment, i.e. units, tens or hundreds and this is transferred into 1/10 code by the selection technique described above, by virtue of the connection arrangement such as is shown in FIG. 1 between the input equipment (U) and the respective gating circuits PRG.

Referring to FIG. 2 in the quiescent condition the rectifier in series with each code wire such as TW is reverse biased by the positive source ($+12$ v.) connected through the resistor to terminal A in bias gate CCG10 and through R1 to the translation wire on one side of the rectifier, together with the negative source ($-12$ v.) connected through LP2, R2, and the secondary of transformer T and R1 in PDG10 to the other side of the rectifier.

Thus referring to FIG. 1 when a pulse drive gate PDG which is positively biassed at is $d$ and $e$ inputs is activated by a pulse input at $f$ a voltage pulse is developed in the primary of the coupling transformer T, and the corresponding pulse developed in the secondary, although it overcomes the $-12$ v. at the transformer end of the code wire, is insufficient in itself to overcome the full 24 v. reverse bias applied to the rectifier. Simultaneously with the driving of the pulse drive gate the drive pulse is applied to the input $f$ of a pulse receive gate PRG, and this causes the terminal A of this gate, if open, to be brought from its quiescent $+12$ v. towards ground potential. A bias gate CCG is similarly activated at terminal $f$ causing its point A also to be driven towards ground potential so that the positive going pulse from the transformer of the pulse drive gate PDG in combination with the simultaneous pulse from the pulse receive gate PRG is enabled by the ground biassing of the bias gate CCG to cause a current pulse to be driven through the code wire.

It will be noted that the individual connection of the rectifier in the field code wires has the effect of decoupling the wires from one another thereby substantially minimising cross-talk, since the arrival of the positive going pulse at the common point adjacent to the junction of the resistor and capacitor will simply back off to a greater extent the rectifiers in the wires connected to this common point. Also any induced signals in other code wires will meet the backed-off rectifier so that these signals meet with high attenuation.

In the control of the translator a particular sequence of operations is necessary. Firstly, since the translator may be put into use almost immediately following a previous use there may be charges remaining on some of the capacitors which have not had time to leak away and hence a preliminary operation of the translator is necessary to make sure that all capacitors are completely discharged before a further translation is effected.

Secondly, when a code is marked in to energise a bias gate CCG the point A of the associated amplifier is driven towards ground potential and hence the capacitors of the drive gate elements require some time to charge up to this condition from the the $+12$ volt in the pulse receive gates via the bias resistor $R_1$ to the ground condition which has been established in the selected CCG gate. It is only after sufficient time has been allowed for this to occur that the selected pulse drive gate and the selected pulse receive gate are energised. The logic circuitry shown in FIG. 1 is provided to effect this sequence of operations.

Referring to FIG. 1 a start signal from a program control PC changes the state of a bistable element TH3 from its A state to its B state whereby a signal is passed via an isolating gate to one input lead of an AND gate CR1. Bias to a second input lead of this gate is provided by an AND gate GA3 which responds to the relevant thousands digit as determined by the input connections from the common thousands digit lines, represented by TH, via two isolating gates GA1 and GA2. Thus the start signal is only effective in the translator selected by the thousands digit, causing gate CR1 to supply a pulse to a monostable element MA1. This latter element provides an output for a predeterminal period (10 $\mu$s.), and this output is inverted by inverter BD1 this providing a positive output for switching on pulse drive gates PDG1–10 and pulse receive gates PRG1–10 so as to discharge any of the capacitors in the field drive gates FDG which have retained charge. At this stage the outputs from ring cores such as RC through which the code wires are threaded, are inhibited by an inhibit marking imposed on these outputs via lead O/P.

The end of the 10 $\mu$s. pulse from the monostable element MA1 sets bistable element TH1 via AND gate CF4 and (1) removes the inhibit marking from lead O/P and bistable element TH4 via isolating gates GD1 and GD2;
(2) sets bistable element TH2 to its B state via AND gate CF3;
(3) provides bias to an input lead of AND gate CF1;
(4) pulses a second monostable element MB1 via AND gate CS2, whose second input lead is permanently earth biased.

In its B state bistable element TH2 switches on, via isolating gate GD3 and the lead to terminals X, the tens and units input equipments T and U, except those units which are held off by relevant tens and units input digit marking signals, this leaving the correct marking conditions. Bistable element TH2 in switching to its B state from its A state is effective, via isolating gate GC1, to allow at terminal $f$ the particular bias gate CCG selected by the hundreds input digit to switch on and charge up 10 of the drive gate capacitors (reference FIG. 3). Monostable element MB1 provides an output pulse over a timed period (200 $\mu$s.) and the end of this pulse from MB1 is fed via inverter BB1 to pulse via AND gate CS1 monostable element MA1 for the second time. The resulting output of MA1 is fed via BD1 in the form of $+ve$ output for 10 $\mu$s. which switches on the selected PDG and PRG pulse drive and pulse receive gates to drive a pulse down the selected field code wire. The code wire pulses the output gates (not shown) of the wound cores through which it is threaded, an example (RC) of which is shown associated with code wire TW, and the code is staticised in output stores (not shown) in 2/5 code.

The end of the 10 $\mu$s. pulse from MA1 switches bistable element TH4 via gate CF1, and TH4 sends a signal to the program control via SA1 to indicate that the output is ready. Switching of bistable element TH4 resets bistable element TH2 via CF2 thus releasing the activated bias gate CCG.

The program control PC sends a signal which resets bistable element TH4 thus removing the "output ready" signal. At this stage the staticised output information is still available.

On receipt of a release ground signal from the program control PC bistable element TH3 is reset. Resetting of bistable element TH3 resets element TH1 via gate CF5 which restores the inhibit condition to the outputs of the ring cores via lead O/P. The translator is now ready for the next application. (The marking signals can be removed by the program control as soon as it receives the "output ready" signal.)

We claim:

1. A data translator including means for translating input data code combinations into signals on code wires where each code wire is uniquely associated with an input code combination, said means comprising a plurality of diode rectifiers, each diode rectifier being connected in series with a respective said code wire between a first terminal remote from said diode rectifier and a second terminal directly connected to one terminal of said diode rectifier, the circuits between said first and second terminals being grouped in first, second and third groupings, each grouping involving all of said circuits, a plurality of first marking circuits, each marking circuit having an output connected in common to the second terminals of a different group within said first grouping, each said first marking circuit being responsive to predetermined input data code combinations to tend to bias the diode rectifiers of the associated group into a conducting condition, a plurality of second marking circuits, each second marking circuit having an output connected to the first terminals of a different group within said second grouping, each said second marking circuit being responsive to predetermined input data code combinations to tend to bias the diode rectifiers of the associated group into a conducting condition, a plurality of third marking circuits, each third marking circuit having an output connected to the first terminals of a different group of said third grouping, said second and third marking circuits being connected to said first terminals by a plurality of gate circuits, each gate circuit having first and second input terminals and an output terminal and comprising a capacitor connected between said first input terminal and said output terminal and a resistor connected between said second input terminal and said output terminal, said output terminal of each gate circuit being connected in common to said first terminals of a sub-group of code wires, each said sub-group comprising code wires which fall in one group of said second grouping and in one group of said third grouping, a sub-group being uniquely identified by the two groups containing it, said output of each second marking circuit being connected in common to said first input terminals of the gate circuits associated with that second marking circuit, and said output of each third marking circuit being connected in common to said second input terminals of the gate circuits associated with that third marking circuit, each code wire being energized by a unique combination of said first, second and third marking circuits.

2. A translator according to claim 1, and comprising a plurality of magnetic ring cores, each said code wire being coupled to a predetermined combination of said ring cores, and control circuit means connected to all of said capacitors and responsive to a start signal for applying a discharge signal to said capacitors for a predetermined period prior to a translation operation, said control circuit means inhibiting any output from said ring cores during said predetermined period.

3. A translator according to claim 2, wherein said control circuit means includes pulse generating means connected to said first, second and third marking circuits for energizing selected ones thereof at the end of said predetermined period.

References Cited

UNITED STATES PATENTS

| | | | |
|---|---|---|---|
| 2,957,168 | 10/1960 | Dempsey et al. | 340—347 |
| 2,960,682 | 11/1960 | French | 340—347 |
| 2,975,410 | 3/1961 | Groce et al. | 340—347 |
| 3,011,165 | 11/1961 | Angel et al. | 340—347 |
| 3,077,591 | 2/1963 | Akmenkalns et al. | 340—347 |
| 3,308,284 | 3/1967 | Grubb | 340—347 |

DARYL W. COOK, Primary Examiner

C. D. MILLER, Assistant Examiner

U.S. Cl. X.R.

179—18